United States Patent
Mizuno et al.

(10) Patent No.: US 6,345,544 B1
(45) Date of Patent: Feb. 12, 2002

(54) ELECTROMAGNETIC LOAD DETECTION DEVICE

(75) Inventors: Yutaka Mizuno; Nobuo Hara, both of Shizuoka-ken (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 09/380,234

(22) PCT Filed: Dec. 25, 1998

(86) PCT No.: PCT/JP98/05966

§ 371 Date: Aug. 26, 1999

§ 102(e) Date: Aug. 26, 1999

(87) PCT Pub. No.: WO99/34182

PCT Pub. Date: Jul. 8, 1999

(30) Foreign Application Priority Data

Dec. 26, 1997 (JP) .............................. 9-360103
Dec. 25, 1998 (JP) .............................. 9-369049

(51) Int. Cl.$^7$ .............................. G01L 1/12; G01L 3/02
(52) U.S. Cl. .............................. 73/862.69; 73/862.331
(58) Field of Search .............................. 73/779, 862.69, 73/862.331, 862.333, 862.334, 862.335, 862.336, DIG. 2, 862.08

(56) References Cited

U.S. PATENT DOCUMENTS

| | | | | |
|---|---|---|---|---|
| 4,598,595 A | * | 7/1986 | Vranish et al. | ........... 73/862.08 |
| 4,823,621 A | * | 4/1989 | Sobel et al. | ............. 73/DIG. 2 |
| 4,933,580 A | * | 6/1990 | Ishino et al. | ............. 73/DIG. 2 |
| 5,092,182 A | * | 3/1992 | Ikeda et al. | ................... 73/779 |

FOREIGN PATENT DOCUMENTS

| | | | | |
|---|---|---|---|---|
| JP | 5-118932 | * | 10/1991 | ............. G01L/1/00 |
| JP | 09166506 | * | 12/1995 | ............. G01L/3/10 |

* cited by examiner

*Primary Examiner*—Benjamin R. Fuller
*Assistant Examiner*—Maurice Stevens
(74) *Attorney, Agent, or Firm*—Ernest A. Beutler

(57) ABSTRACT

A load detection device according to this invention has a detection section including a magnetization coil (2) and a solid rod-like magnetic substance disposed in the axial center of the magnetization coil (2), the magnetic substance (1) is magnetized by the magnetization coil (2), and load (P) is applied directly to the magnetic substance (1) to produce inductance change, so as to be detected. Therefore, according to this invention, the device is simplified in its construction with a high mechanical strength and a wide dynamic range, capable of effecting smaller size, weight saving and cost reduction, as well as easy handling ability, and suitable for transfer. In addition, the load (P) is detected from inductance change due to change in magnetic permeability of the magnetic substance (1) caused by the load, so that no displacement is accompanied with detection, providing a structure capable of achieving high direct response and easy adjustment with small hysteresis, and unlikely to be affected magnetically.

8 Claims, 16 Drawing Sheets

ELECTROMAGNETIC LOAD DETECTION DEVICE

BACKGROUND OF THE INVENTION

This invention relates to a load detection device for electromagnetically detecting load applied directly to a magnetic substance.

As a load sensor for measuring load applied to an elastic member, a strain gage type load cell has been known in which the strain of the elastic member deformed by a load is measured and the load applied to the elastic member is calculated from the strain measured.

However, the strain gage type load cell poses problems that its mechanical strength is low, the allowance for forces above the rated load is small because of its narrow dynamic range (range of load in use), measuring accuracy is not secured for a small load when it is of a high rating type, and it is complicated in its signal processor circuit because of week output signals and thus expensive.

In view of the foregoing, it is the object of this invention to provide a load detection device having a simple construction, a high mechanical strength and a wide dynamic range, capable of effecting smaller size, weight saving and cost reduction, and of achieving high response, as well as providing easy handling ability and easy adjustment, and suitable especially for transfer.

SUMMARY OF THE INVENTION

In order to achieve the foregoing object, this invention of claim 1 is characterized by a load detection device having a detection section including a coil and a solid rod-like magnetic substance disposed in the axial center of said coil, wherein said magnetic substance is magnetized by said coil, and load is applied directly to the magnetic substance to produce inductance change, so as to be detected.

The invention of claim 2 is characterized by the invention of claim 1, wherein a plurality of said detection sections are provided, said detection sections being adapted to produce a difference in inductance change for a load, and the load is detected from the difference in inductance change.

The invention of claim 3 is characterized by the invention of claim 2, wherein said difference in inductance change is produced by a difference in the magnetostrictive coefficient between magnetic substances used in said detection sections.

The invention of claim 4 is characterized by the invention of claim 2, wherein said difference in inductance change is produced by a difference in stress between magnetic substances used in said detection sections.

The invention of claim 5 is characterized by the invention of claim 2, wherein said difference in inductance change is produced by a difference in hardness of heat treatment between magnetic substances used in said detection sections.

The invention of claim 6 is characterized by the invention of claim 2, wherein said difference in inductance change is produced by a difference in magnetic permeability between magnetic substances used in said detection sections.

The invention of claim 7 is characterized by the invention of claim 1, wherein part of said magnetic substance is modified or deformed, and load is detected from a difference in inductance between the modified or deformed part and the other part of the magnetic substance.

The invention of claim 8 is characterized by the invention of claim 7, wherein means for partially modifying or deforming said magnetic substance is work hardening, heat treatment, surface treatment or diameter changing.

The invention of claim 9 is characterized by the invention of claim 2, wherein a plurality of detection sections are disposed coaxial with and opposite to each other, and a difference between output signals from detection sections is determined, so as to detect load applied to magnetic substances in the detection sections.

The invention of claim 10 is characterized by the invention of claim 2, wherein a plurality of detection sections are disposed coaxial and integral with each other, and load is applied at the central portion, so as to be detected in a plurality of directions.

The invention of claim 11 is characterized by the invention of claim 2, wherein a plurality of detection sections are disposed coaxial and integral with each other, a single magnetic substance common to the detection sections is provided, and the magnetic substance is fixed at the central portion, so as to detect load in a plurality of directions.

Therefore, according to this invention, the load detection device is composed of a solid rod-like magnetic substance and a coil for magnetizing the same, so that the diameter of the magnetic substance can be smaller and the construction is simplified, providing a device with a high mechanical strength and a wide dynamic range, capable of effecting smaller size, weight saving and cost reduction, as well as easy handling ability, and suitable for transfer.

Further, according to this invention, a magnetic substance with a small diameter is disposed at the axial center of a coil where the density of magnetic flux is the highest, so that energy necessary for magnetizing the magnetic substance can be kept minimum and inductance is kept small, thus providing easy high-frequency drive advantageous to detection.

Furthermore, according to this invention, load is applied directly to a magnetic substance and the load is detected from inductance change due to change in magnetic permeability of the magnetic substance caused by the load, so that no displacement is accompanied with detection, providing a structure capable of achieving high direct response and easy adjustment with small hysteresis, and unlikely to be affected magnetically.

BEST MODE FOR CARRYING OUT THE INVENTION

Embodiments of this invention will be described below with reference to the accompanying drawings.

EMBODIMENT 1

Figure 1:
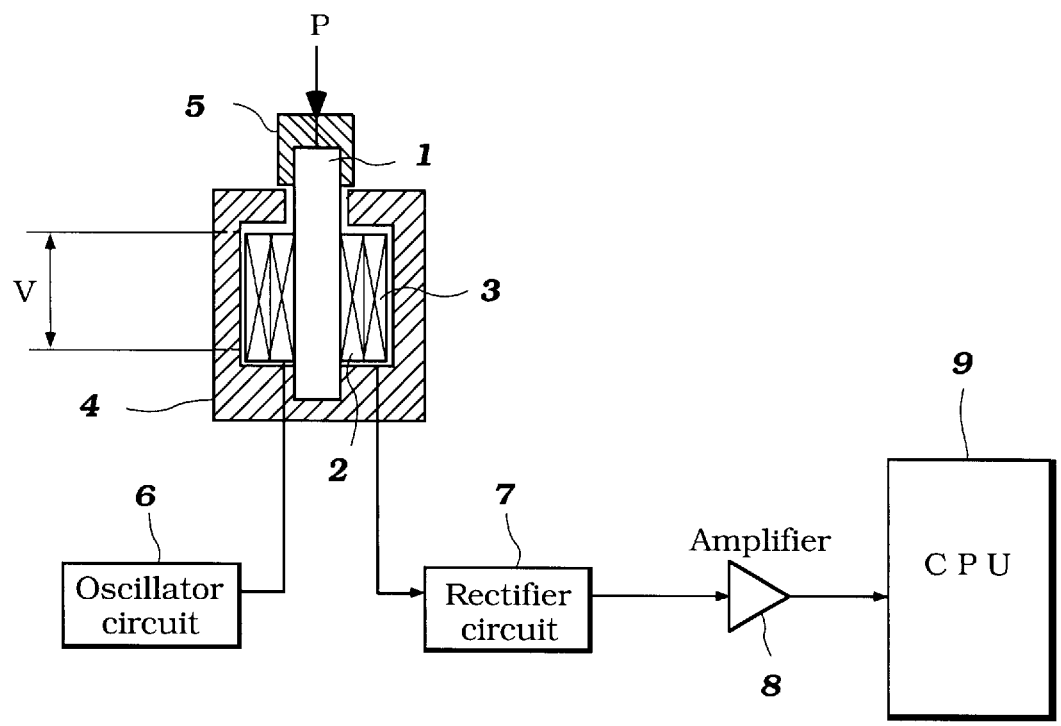
FIG. 1 is a sectional view showing a basic structure of a load detection device according to an embodiment 1 of the invention.

FIG. 1 is a sectional view showing a basic structure of a load detection device according to an embodiment 1 of this invention.

In FIG. 1, numeral 1 designates a solid rod-like magnetic substance, which is surrounded by a magnetization coil 2 and a detection coil 3. Therefore, the magnetic substance 1 is disposed at the axial center of the magnetization coil 2 and the detection coil 3, and the magnetic substance 1, magnetization coil 2 and detection coil 3 are enclosed in a magnetic shield case 4 made of a magnetic material. The magnetization coil 2 and the detection coil 3 are electrically insulated.

The magnetic substance 1 is made of a magnetic material such as ferroalloy, ferrochromium, ferronickel, ferrocobalt, pure iron, ferrosilicon, permalloy, etc, a soft magnetic material or a super magnetostrictive material, and on its top end protruding upwardly from the magnetic shield case 4 is fitted a joint 5 made of a non-magnetic material. The joint 5 acts as a shock absorber and a magnetic shield member.

To the magnitization coil 2 is electrically connected an oscillator circuit 6, and to the detection circuit 3 are electrically connected a rectifier circuit 7, an amplifier 8 and a CPU 9 as a processor.

Now, functions of the load detection device will be described.

The magnetic substance 1 is magnetized by the magnetization coil 2 driven by the oscillator circuit 6, and when the load P is applied to the magnetized magnetic substance 1 in the axial direction through the joint 5, as shown in the figure, a compression force is exerted on the magnetic substance 1 to decrease its magnetic permeability as a result of magnetostrictive effects and produces inductance change, which causes the voltage across both ends of the magnetization coil 2 to change and at the same time the voltage V across both ends of the detection coil 3 to change in proportion to the ratio of the number of turns as well. The magnetostrictive effects ranges from some hundreds of ppm to some thousands of ppm for super magnetostrictive materials and below some tens of ppm for other materials.

The voltage V is amplified by the amplifier 8 after rectified in the rectifier circuit 7, inputted to the CPU 9 as an output signal, and the CPU 9 calculates the magnitude of the load P applied to the magnetic substance 1, based on the voltage V.

Therefore, in this embodiment, the load detection device is composed of a magnetic substance 1, a magnetization coil 2 for magnetizing the same, a detection coil 3 for detecting the voltage V, a magnetic shield case 4 for magnetically shielding these components, etc, so that the device is simplified in construction with a high mechanical strength, capable of effecting smaller size and weight saving, as well as easy handling ability, and suitable for transfer.

Further, the load detection device according to this embodiment, the magnetic substance 1 with a small diameter is disposed at the axial center of the magnetization coil 2 where the magnetic flux density is the highest, so that energy necessary for magnetizing the magnetic substance 1 can be kept minimum and the inductance can be kept small, thus providing easy high-frequency drive advantageous to detection.

Furthermore, in the load detection device according to this embodiment, a load P is applied directly to the magnetic substance 1 and the load P is detected from inductance change due to change in the magnetic permeability of the magnetic substance 1 caused by the load P, so that no displacement is accompanied with detection, providing high direct response and easy adjustability with small hysteresis. A large detection output can advantageously be achieved, especially when a super magnetostrictive material is used for the magnetic substance 1. In addition, the detection section composed of a magnetic substance 1, a magnetization coil 2 and a detection coil 3, is magnetically shielded by a magnetic shield case 4, so that detection results are not likely to be affected magnetically, providing highly accurate detection of the load P.

Although the magnetization coil 2 and the detection coil 3 are employed in this embodiment, only the magnetization coil 2 may be used for detecting the voltage (the same will be applied to the following embodiments).

EMBODIMENT 2

Figure 2:
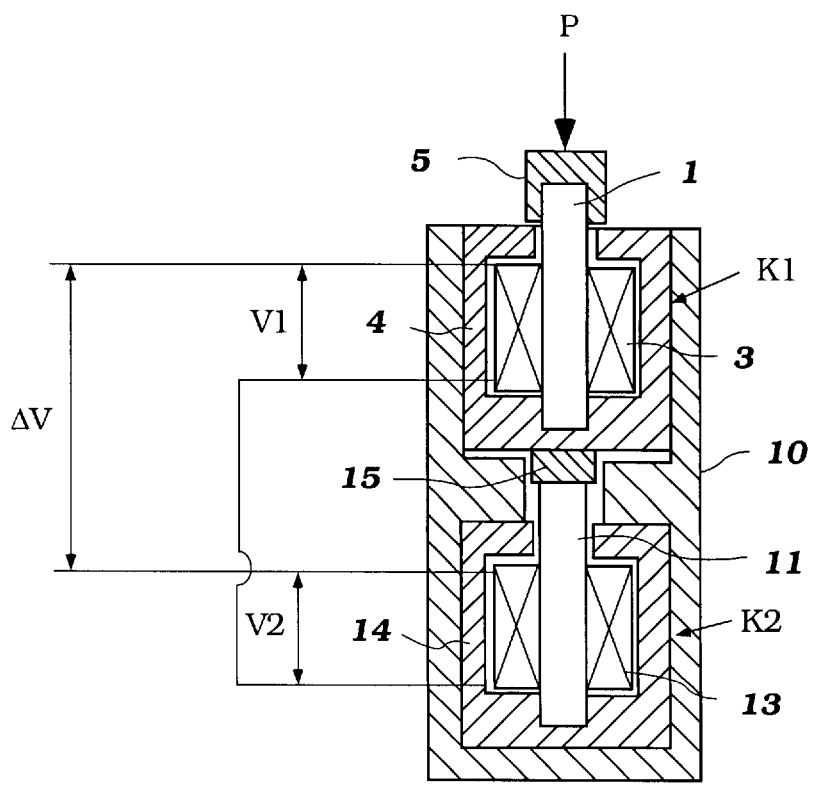
FIG. 2 is a sectional view showing a basic structure of a load detection device according to an embodiment 2 of the invention.

Now, an embodiment 2 of this invention will be described with reference to FIG. 2. FIG. 2 is a sectional view showing a basic structure of a load detection device according to this embodiment, and in the figure, the magnetization coil and the signal processor circuit are omitted.

The load detection device according to this embodiment is arranged such that two detection sections K1, K2 are disposed vertically in series and coaxially, and covered by one case 10 made of a non-magnetic material.

The detection section K1 includes a magnetic substance 1, a detection coil 3 disposed therearound and a magnetic shield case 4 for enclosing these components, and similarly, the detection section K2 includes a magnetic substance 11, a detection coil 13 disposed therearound and a magnetic shield case 14 for enclosing these components, the magnetic substance 11 being connected to the magnetic shield case 4 of the detection section K1 through a joint 15 made of a non-magnetic material.

In the load detection device according to this embodiment, the magnetic substances 1, 11 in the detection sections K1, K2 are made of materials of different magnetostrictive constants, and the axial load P applied to the magnetic substance 1 through the joint 5 is equally applied to the other magnetic substance 11 through the joint 15.

Therefore, in the load detection device according to this embodiment, identical loads P are applied to the magnetic substances 1, 11 in the detection sections K1, K2, respectively, but since the magnetostrictive constants of these magnetic substances 1, 11 are different from each other, inductance changes in the detection sections K1, K2 differentiate from each other, and voltages V1, V2 produced in the detection coils 3, 13 as a result of the difference in the inductance change, also show values different from each other.

The voltages V1, V2 generated in the detection coils 3, 13 are affected by environmental conditions (temperature or humidity), etc, but in the detection device according to this embodiment, the difference (V2−V1) between voltages V1, V2 is detected as a differential output ΔV, allowing the load P to be detected without being affected by environmental conditions, etc.

In addition, while the same effects as in the embodiment 1 can be achieved also in this embodiment, a larger amplification factor can be possible because of high accuracy, and general materials can be used as magnetic substances 1, 11 in place of expensive super magnetostrictive materials, thus effecting further cost reduction of the device.

Although materials with different magnetostrictive constants are used for the magnetic substances 1, 11 as a means for producing a difference in inductance change in the detection sections K1, K2, materials of different magnetic permeability may be used, or the same materials with different hardness (for example, one of which undergoes a treatment and the other of which does not) imparted by heat treatment, surface treatment (plating, carburizing, nitriding treatment, etc) or work hardening (shot peening, etc), may be used.

Figure 3:
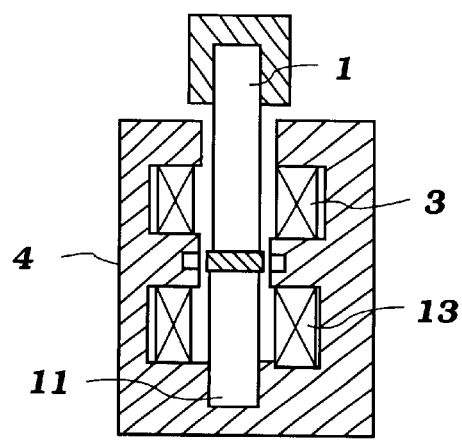
FIG. 3 is a sectional view showing a variant of the load detection device according to the embodiment 2 of the invention.

Further, as shown in FIG. 3, the magnetic substances 1, 11 and the detection coils 3, 13 may be enclosed in one integrated magnetic shield case 4. In this case, further weight saving and smaller size can be possible, providing a smaller number of parts as well as cost reduction.

EMBODIMENT 3

Figure 4:
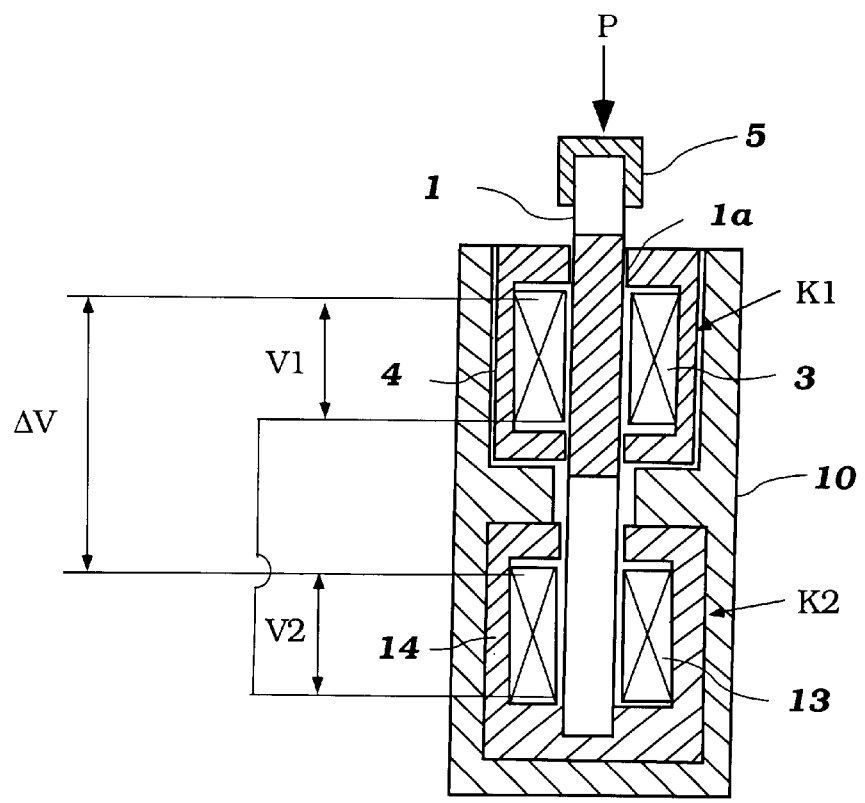
FIG. 4 is a sectional view showing a basic structure of a load detection device according to an embodiment 3 of the invention.

Now, an embodiment 3 of this invention will be described with reference to FIG. 4. FIG. 4 is a sectional view showing a basic structure of a load detection device according to this embodiment, and in this figure, the magnetization coil and the signal processor circuit are omitted as well.

The load detection device according to this embodiment is also arranged such that two detection sections K1, K2 are disposed vertically in series, and covered by one case 10 made of a non-magnetic material, but one magnetic substance 1 common to the detection sections K1, K2 is provided. The magnetic substance 1 is partially heat-treated at a portion 1a on the detection section K1 side. The portion 1a of the magnetic substance 1 may include the surface only.

When heat treatment is applied to the portion 1a of the magnetic substance 1 as described above, the metallic composition of the portion 1a is changed to differentiate the magnetic permeability of the portion 1a from that of the other portions with the same result that the two magnetic substances of different magnetic permiability are used. Therefore, like the embodiment 2 described above, as a result of the difference (V2−V1) between voltages V1, V2 generated in the detection coils 3, 13 being detected as a differential output ΔV, the load P applied directly to the magnetic substance 1 can be detected with high accuracy without being affected by environmental conditions, etc.

In addition, a single magnetic substance 1 is used in this embodiment, thus securing an even higher detection accuracy.

Figure 5:
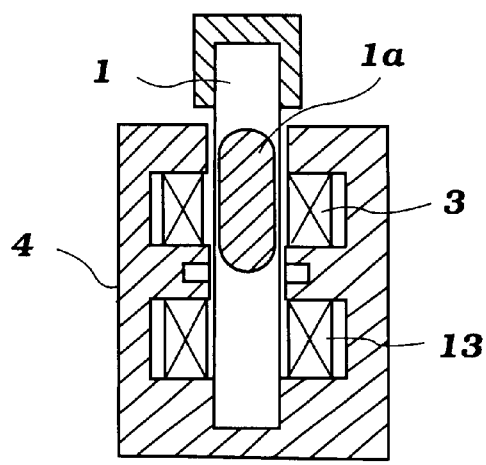
FIG. 5 is a sectional view showing a variant of the load detection device according to the embodiment 3 of the invention.

Alternatively, as shown in FIG. 5, the magnetic substance 1 and the detection coils 3, 13 may be enclosed in one integrated magnetic shield case 4. In this case, further weight saving and smaller size can be effected, allowing a smaller number of parts as well as cost reduction.

EMBODIMENT 4

Figure 6:
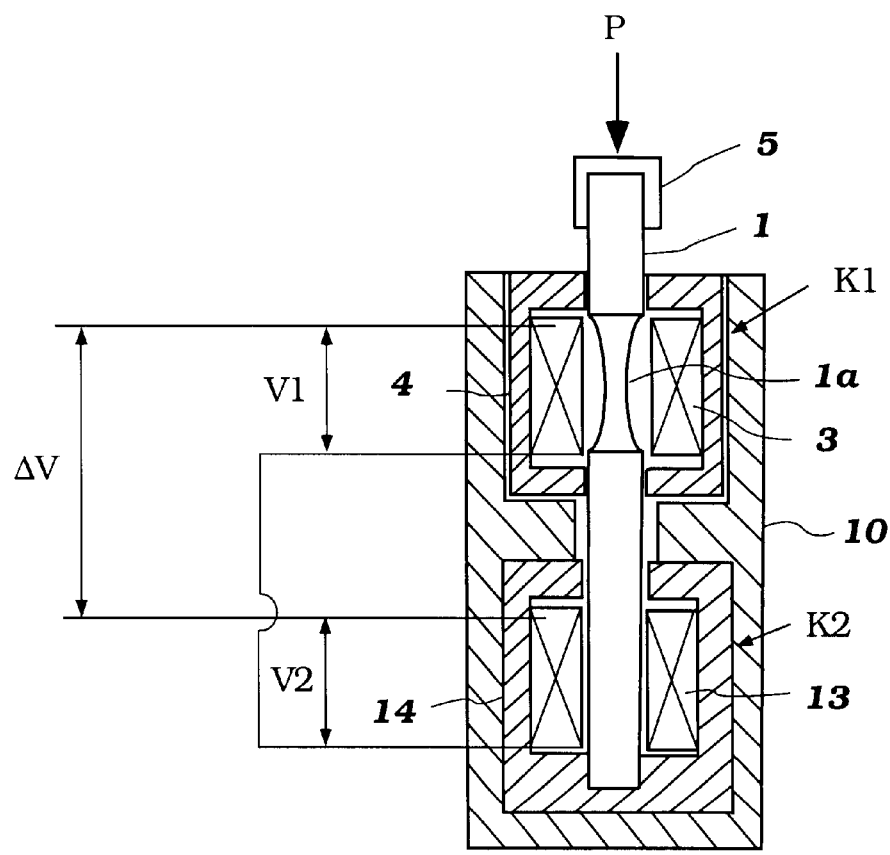
FIG. 6 is a sectional view showing a basic structure of a load detection device according to an embodiment 4 of the invention.

Now, an embodiment 4 of this invention will be described with reference to FIG. 6. FIG. 6 is a sectional view showing a basic structure of a load detection device according to this embodiment, and in this figure, the magnetization coil and the signal processor circuit are omitted as well.

The load detection device according to this embodiment is also arranged such that two detection sections K1, K2 are disposed vertically in series, and covered by one case 10 made of a non-magnetic material, but one magnetic substance 1 common to the detection sections K1, K2 is provided, and the diameter of a portion 1*a* of the magnetic substance 1 on the detection section K1 side is partially decreased.

When the diameter of the portion 1*a* of the magnetic substance 1 is decreased, the stress in the portion 1*a* caused by the load P becomes larger than that in the other portions with the same result that two magnetic substances of different materials (magnetostrictive constants) are used. Therefore, like the embodiments 2, 3 described above, as a result of the difference (V2−V1) between voltages V1, V2 generated in the detection coils 3, 13 being detected as a differential output ΔV, the load P applied directly to the magnetic substance 1 can be detected with high accuracy without being affected by environmental conditions, etc.

In addition, a single magnetic substance 1 is used also in this embodiment, thus securing an even higher detection accuracy.

Figure 7:
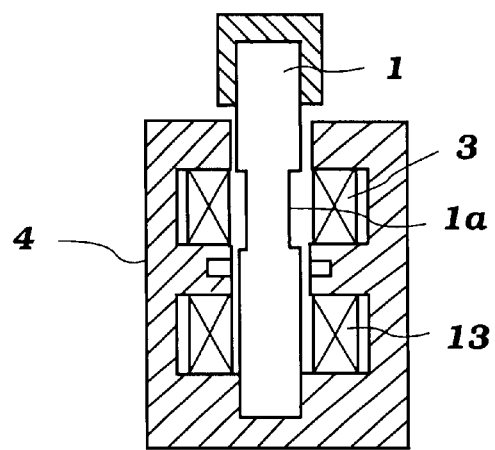
FIG. 7 is a sectional view showing a variant of the load detection device according to the embodiment 4 of the invention.

Alternatively, as shown in FIG. 7, the magnetic substance 1 and the detection coils 3, 13 may be enclosed in one integrated magnetic shield case 4. In this case, further weight saving and smaller size can be effected, allowing a smaller number of parts as well as cost reduction.

EMBODIMENT 5

Figure 8:
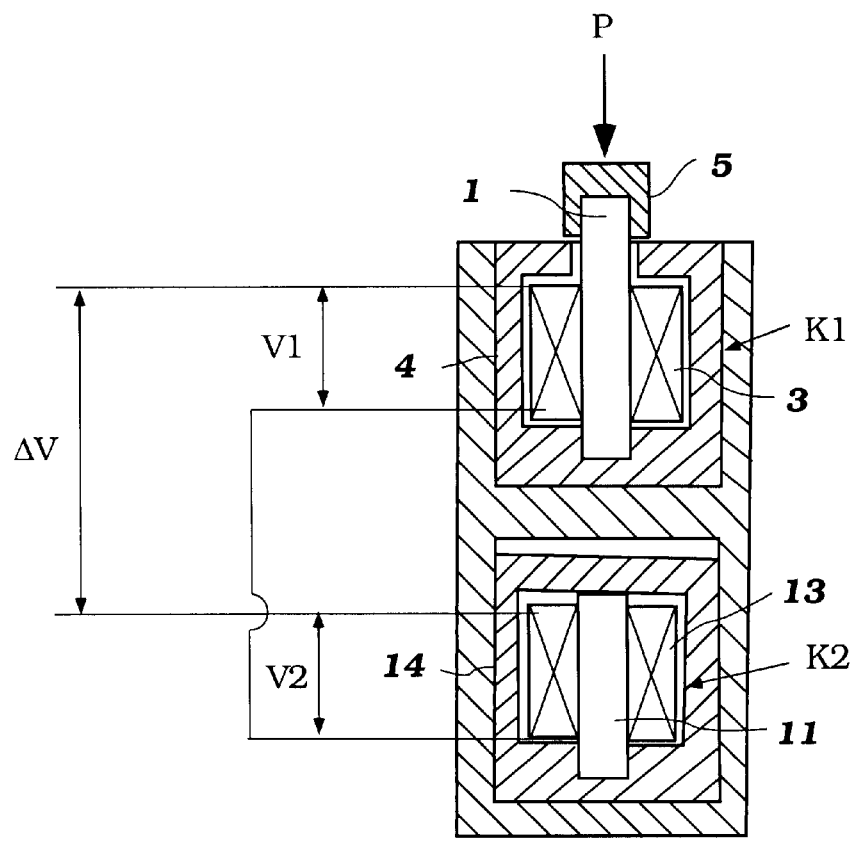
FIG. 8 is a sectional view showing a basic structure of a load detection device according to an embodiment 5 of the invention.

Now, an embodiment 5 of this invention will be described with reference to FIG. 8. FIG. 8 is a sectional view showing a basic structure of a load detection device according to this embodiment, and in this figure, the magnetization coil and the signal processor circuit are omitted as well.

The load detection device according to this embodiment is also arranged such that two detection sections K1, K2 are disposed vertically in series, and covered by one case 10 made of a non-magnetic material, but the detection sections K1, K2 are completely independent, and the load P applied to the magnetic substance 1 of the detection section K1 does not act on the magnetic substance 11 of the detection section K2.

Therefore, in the load detection device according to this embodiment, the load P is applied only to the magnetic substance 1 in the detection section K1, so that the detection section K2 acts as a dummy for compensating for the detection error due to the difference in environmental conditions, etc. Thus, as a result of the difference (V2−V1) between voltages V1, V2 generated in the detection coils 3, 13 being detected as a differential output ΔV, the load P applied directly to the magnetic substance 1 can be detected with high accuracy without being affected by environmental conditions, etc.

In addition, the identical materials can be used for the magnetic substances 1, 11 in this embodiment, thus effecting even further cost reduction.

Figure 9:
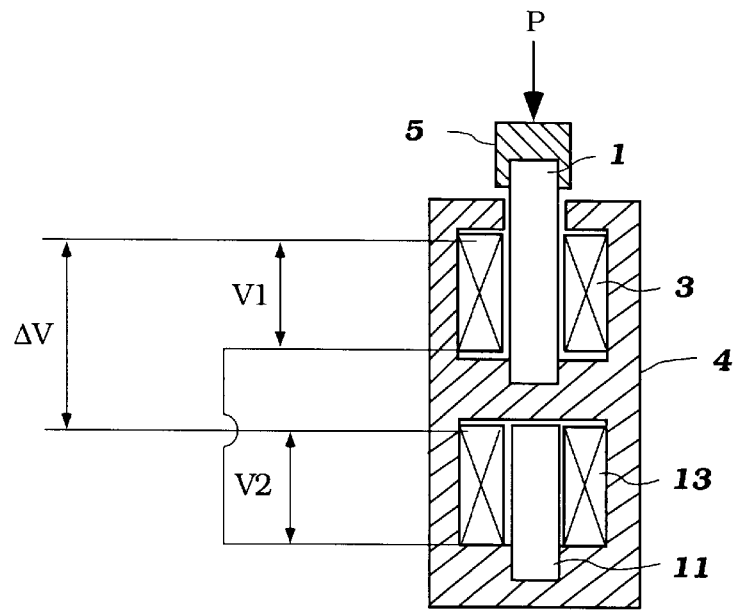
FIG. 9 is a sectional view showing a variant 1 of the load detection device according to the embodiment 5 of the invention.

As shown in FIG. 9, the magnetic substances 1, 11 and the detection coils 3, 13 may be enclosed in one integrated magnetic shield case 4. In this case, further weight saving and smaller size can be effected, allowing a smaller number of parts as well as cost reduction.

Figure 10:
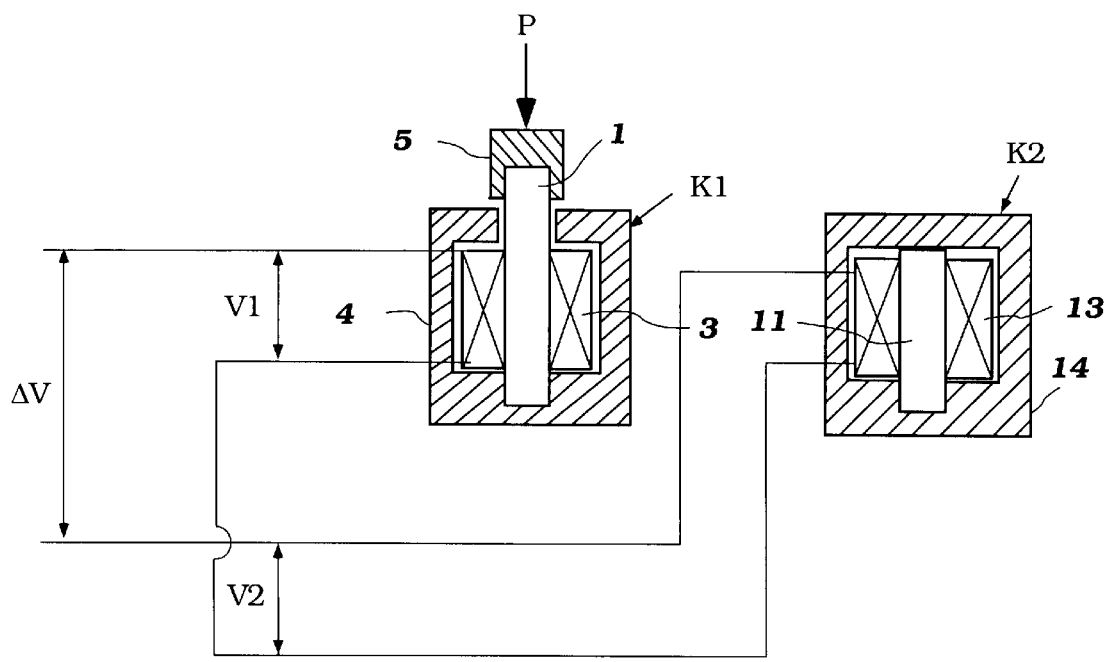
FIG. 10 is a sectional view showing a variant 2 of the load detection device according to the embodiment 5 of the invention.

Alternatively, as shown in FIG. 10, the detection sections K1, K2 may be disposed separate from each other. In this case, only the detection section K1 need be disposed at a position where the load is actually received, which halves the size, resulting in the improvement in the degree of freedom of installation.

EMBODIMENT 6

Figure 11:
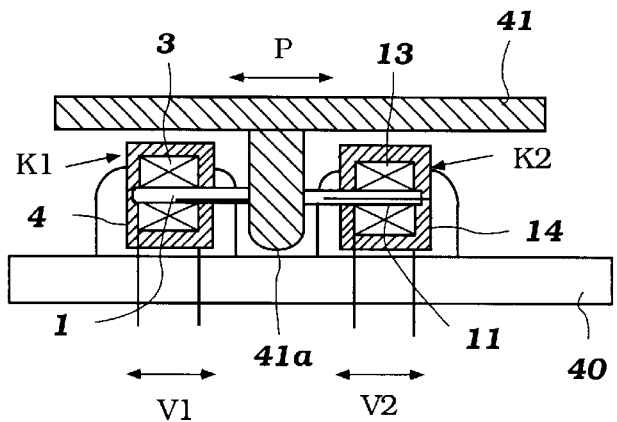
FIG. 11 is a sectional view showing a basic structure of a load detection device according to an embodiment 6 of the invention.
Figure 12:
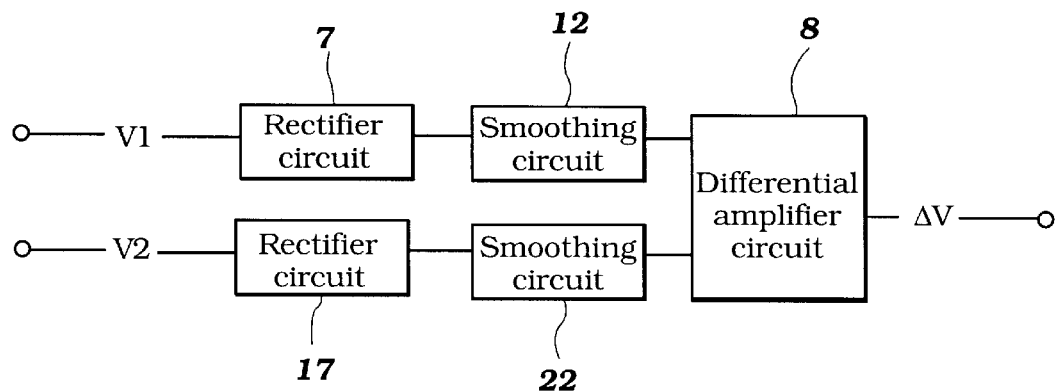
FIG. 12 is a block diagram showing the structure of the signal processor circuit of the load detection device according to the embodiment 6 of the invention.

Now, an embodiment 6 of this invention will be described with reference to FIG. 11 and FIG. 12. FIG. 11 is a sectional view showing a basic structure of a load detection device according to this embodiment, and FIG. 12 is a block diagram showing the structure of the signal processor circuit of the load detection device.

The load detection device according to this embodiment is arranged as shown in FIG. 11 such that two detection sections K1, K2 are disposed opposite to each other on a fixing plate 40, and a projection 41*a* provided on the bottom surface of a laterally movable moving plate 41 is in contact with one ends of the magnetic substances 1, 11 in the detection sections K1, K2. In FIG. 11, numerals 3, 13 designate the detection coils, and numeral 4, 14 the shield cases, the detection coils 3, 13 being magnetized by magnetization circuits (not shown), respectively.

In the load detection device according to this embodiment, the load P applied to the moving plate 41 in either of the right and left directions, can be detected. That is, as shown in FIG. 12, outputs (voltages) V1, V2 from the detection sections K1, K2 are rectified in rectifier circuits 7, 17, also smoothed by smoothing circuits 12, 22, and then inputted in a differential amplifier circuit 8, where the difference ΔV (=V2−V1) between the voltages is determined and amplified to be outputted. The load P applied to the movable plate 41 in either the right or the left direction is calculated from the output.

In this embodiment as described above, the load P in either the right or the left direction can be detected with a simple construction, and the same effects as in the foregoing embodiments 1–5 can be achieved as well.

Figure 13:
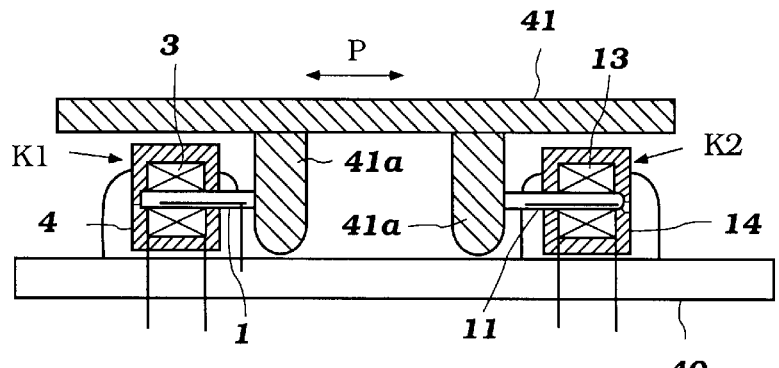
FIG. 13 is a sectional view showing a variant 1 of the load detection device according to the embodiment 6 of the invention.
Figure 14:
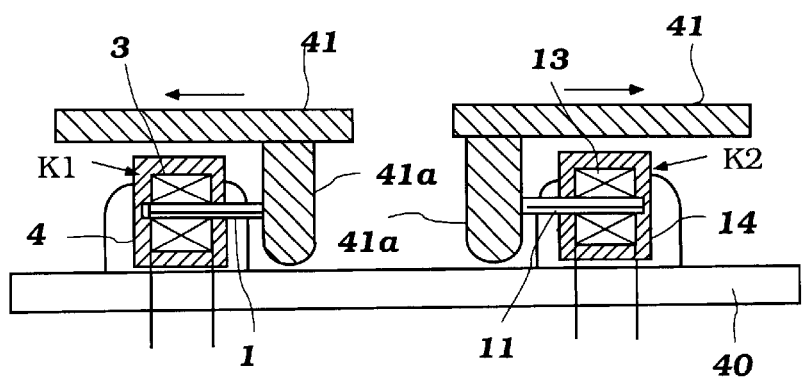
FIG. 14 is a sectional view showing a variant 2 of the load detection device according to the embodiment 6 of the invention.

As shown in FIG. 13, an arrangement may be adopted in which two detection sections K1, K2 are disposed, on the fixing plate 40, opposite to and separate from each other, and each of two projections 41*a* provided on the bottom surface of the laterally movable moving plate 41 is in contact with one end of each of the magnetic substances 1, 11 in the detection sections K1, K2. In this case, as shown in FIG. 14, the moving plate may be divided into two parts.

Figure 15:
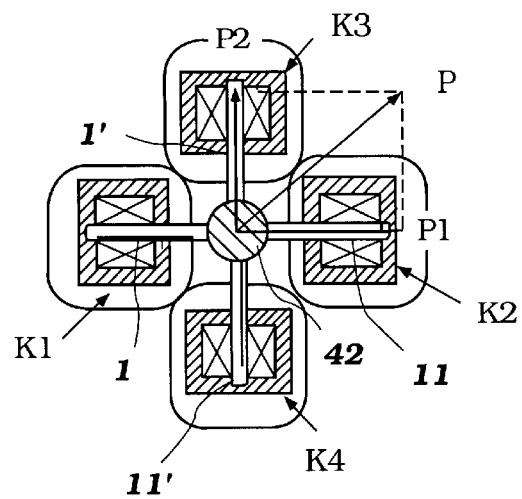
FIG. 15 is a sectional view showing a variant 3 of the load detection device according to the embodiment 6 of the invention.
Figure 16:
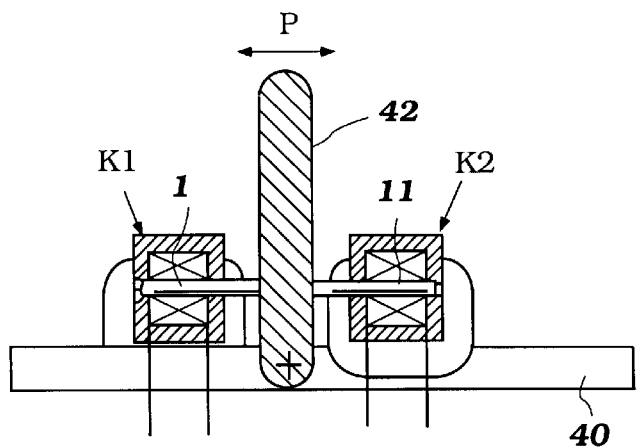
FIG. 16 is a sectional view showing a variant 3 of the load detection device according to the embodiment 6 of the invention.

Alternatively, as shown in FIG. 15 and FIG. 16, four detection sections K1, K2, K3, K4 may be disposed, on the fixing plate 40, opposite to one another, and a rod-like lever 42 tiltably disposed in the center of these sections may be in contact with one ends of the magnetic substances 1, 11, 1', 11' in the detection sections K1–K4 so that the lever 42 may constitutes a joy stick.

In the foregoing arrangement, as a result of the difference between output signals from the opposed detection sections K1, K2 and the opposed detection sections K3, K4 being detected, the force components P1, P2 in the lateral and the longitudinal direction can be detected, respectively, and the magnitude and direction of the load P applied to the lever 42 can be determined from these force components P1, P2 in the form of a vector.

EMBODIMENT 7

Figure 17:
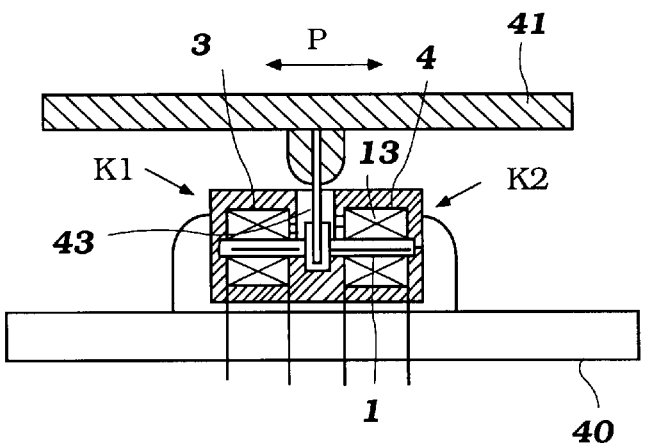
FIG. 17 is a sectional view showing a basic structure of a load detection device according to an embodiment 7 of the invention.

Now, an embodiment 7 of this invention will be described with reference to FIG. 17. FIG. 17 is a sectional view showing a basic structure of a load detection device according to this embodiment.

The load detection device according to this embodiment is fixed on the fixing plate 40, and comprises two detection sections K1, K2 arranged such that a common solid rod-like magnetic substance 1 is enclosed in the axial center of the detection coils 3, 13 disposed coaxially in a common magnetic shield case 4. In this load detection device, opposite ends of the magnetic substance 1 is received by the magnetic shield case 4, and a plate 43 attached to the bottom surface of the laterally movable moving plate 41 is held at the central portion of the magnetic substance 1.

In the load detection device according to this embodiment, when the load P in either the right or the left direction acts on the moving plate 41, the load P is applied to the central portion of the magnetic substance 1 through the plate 43 to compress the left half (on the side of the detection section K1) or the right half (on the side of the detection section K2), so that like the foregoing embodiment 6, the load P applied to the moving plate 41 in either direction can be detected.

In the load detection device according to this invention, since the magnetic substance 1 receives the load at the central portion, if a load P in the left direction is applied to the magnetic substance 1, a compressive load is exerted on the left half of the magnetic substance 1 and no load acts on the right half. On the contrary, if a load P in the right direction is applied to the magnetic substance 1, a compressive load is exerted on the right half of the magnetic substance 1, an no load acts on the left half.

In the load detection device according to this embodiment as described above, since the load P is applied only to the left half (on the detection section K1 side) or the right half (on the detection section K2 side), the detection section K1 or K2 to which no load is applied, acts as a dummy for compensating for the detection error due to the difference in environmental conditions, as in the embodiment 5, and as a result of the difference between the detection sections K1, K2 is detected as a differential output, the load P applied to the moving plate 41 in either of the right and left directions can be detected without being affected by environmental conditions, etc.

Figure 18:
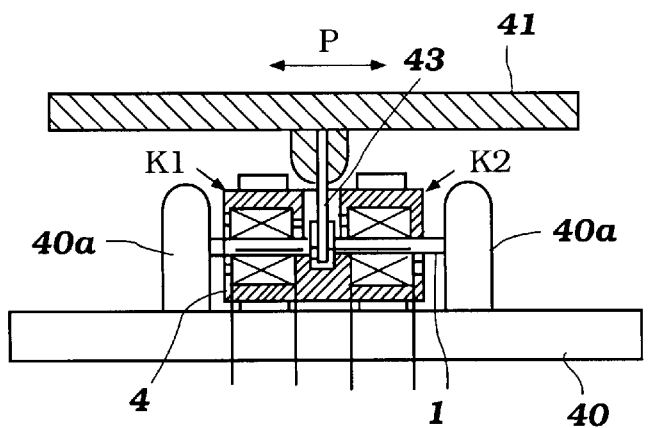
FIG. 18 is a sectional view showing a variant 1 of the load detection device according to the embodiment 7 of the invention.

As described in FIG. 18, if the device is arranged such that the common magnetic substance 1 in the load detection device penetrates the magnetic shield case 4, and the opposite ends thereof are received by projections 40*a* provided on the fixing plate 40, since no load P acts on the magnetic shield case 4, no high mechanical strength is needed for the magnetic shield case 4, thus effecting weight saving of the load detection device with thinner wall thickness.

Figure 19:
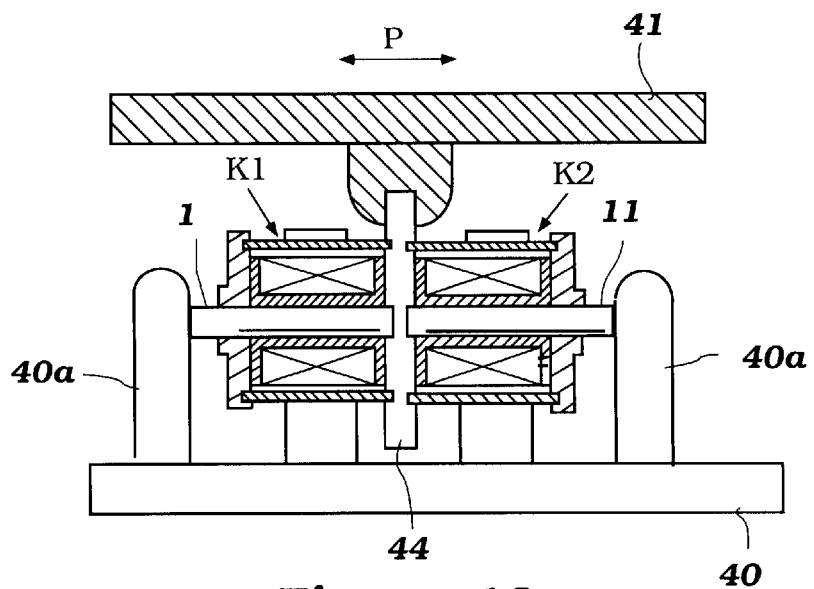
FIG. 19 is a sectional view showing a variant 2 of the load detection device according to the embodiment 7 of the invention.
Figure 20:
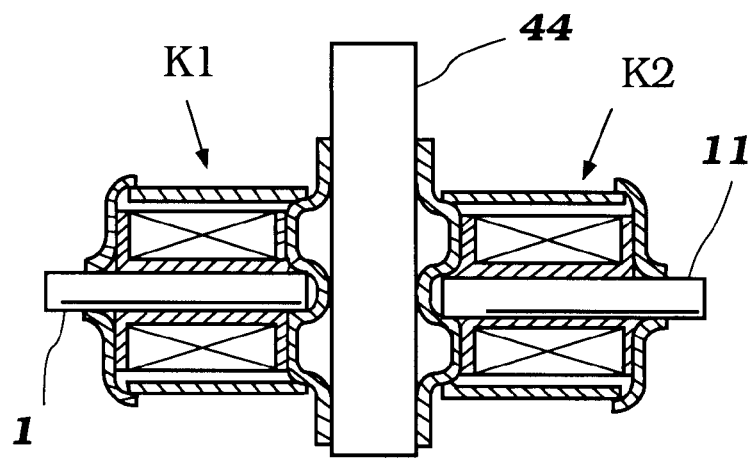
FIG. 20 is a sectional view showing a variant 3 of the load detection device according to the embodiment 7 of the invention.

As shown in FIG. 19, the device may be arranged such that the load detection device is divided into detection sections K1, K2 using a plate 44 fixed to the moving plate 41, one ends of the magnetic substances 1, 11 in the detection sections K1, K2 are received by the plate 44, and the other ends by the projections 40*a* provided on the fixing plate 40. In this case, as shown in FIG. 20, the load detection device may be arranged such that detection sections K1, K2 each having an identical construction as a single body, are disposed, on both sides of the plate 44, coaxial with and opposite to each other.

EMBODIMENT 8

Figure 21:
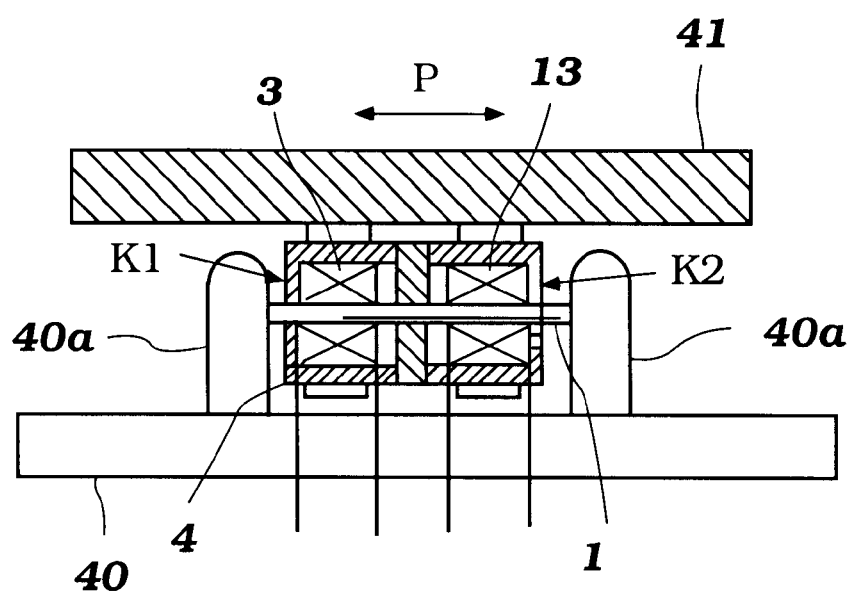
FIG. 21 is a sectional view showing a basic structure of a load detection device according to an embodiment 8 of the invention.

Now, an embodiment 8 of this invention will be described with reference to FIG. 21. FIG. 21 is a sectional view showing a basic structure of a load detection device according to this embodiment.

The load detection device according to this embodiment is fixed on the bottom surface of the laterally movable moving plate 41, and comprises two detection sections K1, K2 arranged such that a common solid rod-like magnetic substance 1 penetrates the axial center of the detection coils 3, 13 disposed coaxially in a common shield case 4. In this load detection device, the central portion of the magnetic substance 1 is fixed to the magnetic shield case 4, and the opposite ends of the magnetic substance 1 protruding sidewardly from the magnetic shield case 4 are in contact with projections 40*a* provided on the fixing plate 40, respectively.

In the load detection device according to this embodiment, like the foregoing embodiment 6, the load P applied to the moving plate 41 in either direction can be detected. However, since the magnetic substance 1 is fixed at its central portion, if a load P in the left direction is applied to the magnetic substance 1, a compressive load is exerted on the right half of the magnetic substance 1 and no load acts on the left half. On the contrary, if a load P in the right direction is applied to the magnetic substance 1, a compressive load is exerted on the left half of the magnetic substance 1, and no load acts on the right half.

In the load detection device according to this embodiment as described above, since the load P is applied only to the left half (on the detection section K1 side) or the right half (on the detection section K2 side), the detection section K1 or K2 to which no load is applied, acts as a dummy for compensating for the detection error due to the difference in environmental conditions, as in the embodiment 5, and as a result of the difference between the detection sections K1, K2 is detected as a differential output, the load P applied to the moving plate 41 in either of the right and left directions can be detected without being affected by environmental conditions, etc.

Figure 22:
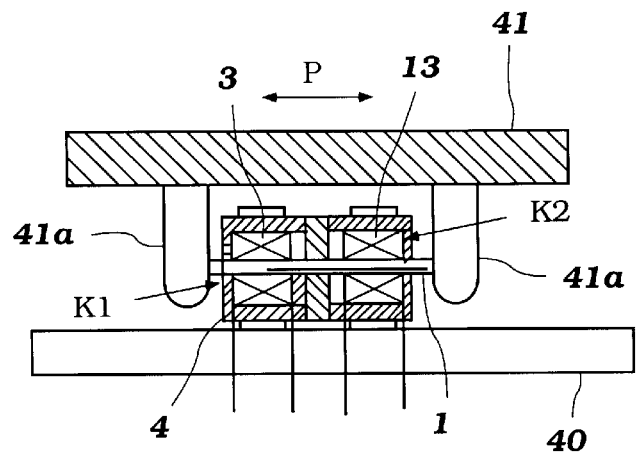
FIG. 22 is a sectional view showing a variant 1 of the load detection device according to the embodiment 8 of the invention.

As shown in FIG. 22, an arrangement may be adopted in which the load detection device is fixed to the fixing plate 40, and the projections 41*a* provided on the bottom surface of the moving plate 41 are in contact with the opposite ends of the magnetic substance 1 penetrating the central portion of the load detection device.

Figure 23:
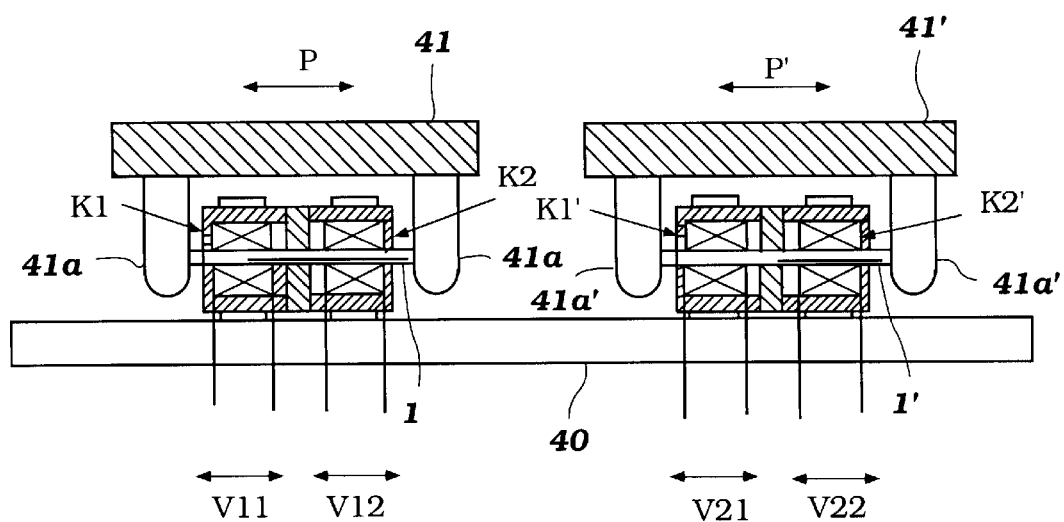
FIG. 23 is a sectional view showing a variant 2 of the load detection device according to the embodiment 8 of the invention.

Alternatively, as shown in FIG. 23, an arrangement may be adopted in which a plurality (two for the example shown in the figure) of load detection devices are disposed on the fixing plate 40, and projections 41*a*, 41*a*' provided on the bottom surfaces of the laterally movable moving plates 41, 41' are in contact with opposite ends of the respective magnetic substances 1, 11 penetrating the central portions of the load detection devices.

Figure 24:
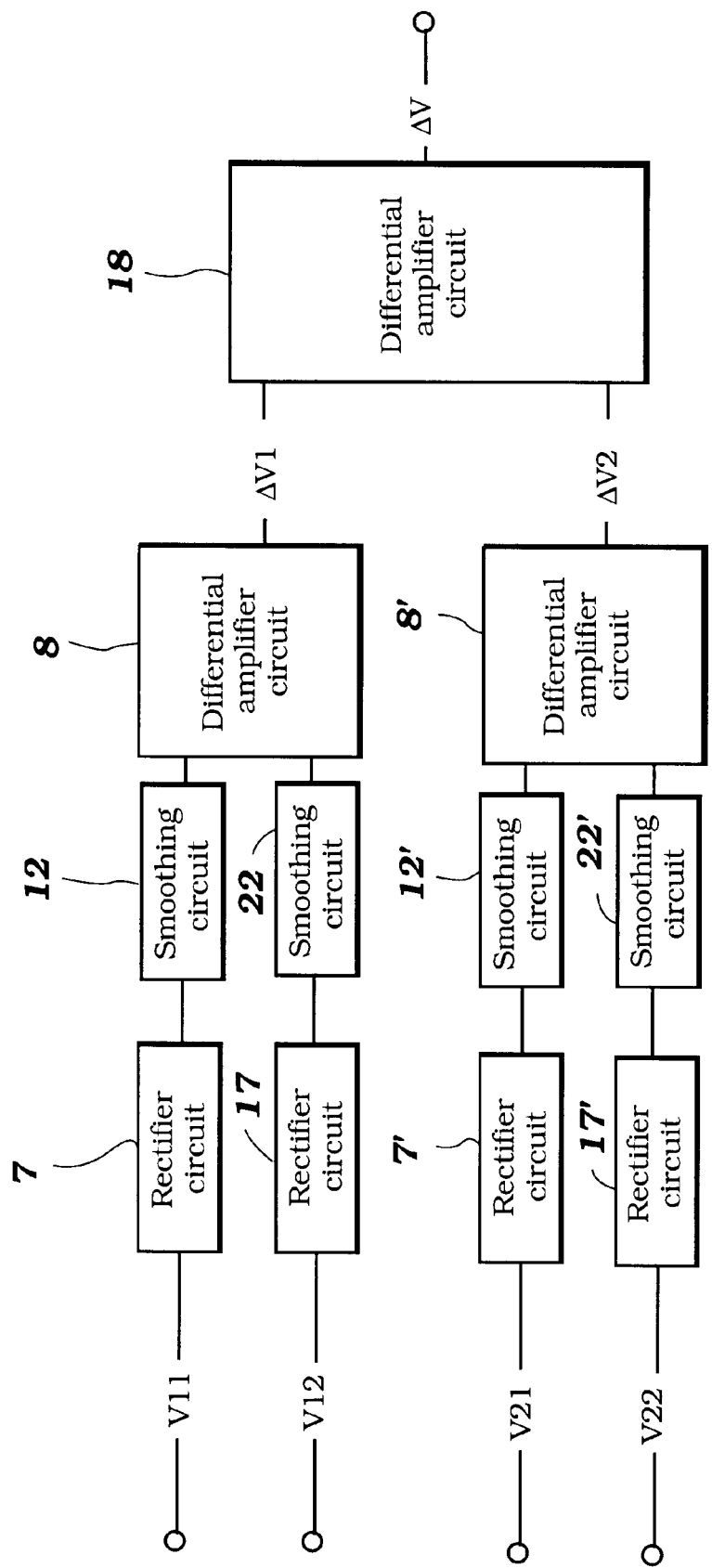
FIG. 24 is a block diagram showing a structure of the signal processor circuit of the load detection device of FIG. 23.

In the case where two load detection devices are provided as shown in FIG. 23, outputs (voltages) V11, V12, V21, V22 from the detection sections K1, K2, K1', K2' in both load detection devices are rectified in rectifier circuits 7, 17, 7', 17' as shown by the block diagram in FIG. 24, respectively, also smoothed by smoothing circuits 12, 22, 12', 22', and then inputted into differential amplifier circuits 8, 8', where differences $\Delta V1$ $(=V12-V11)$, $\Delta V2$ $(=V22-V21)$ are determined and amplified to be outputted. The differences $\Delta V1$, $\Delta V2$ are inputted further to a differential amplifier circuit 18, where a difference $\Delta V$ $(=\Delta V1-\Delta V2)$ between the differences is determined and amplified to be outputted, and a difference between the loads P, P' applied to both moving plates 41, 41' is determined from the difference $\Delta V$.

APPLICATION 1

Now, an application 1 of the load detection device according to this invention will be described with reference to FIG. 25.

Figure 25:
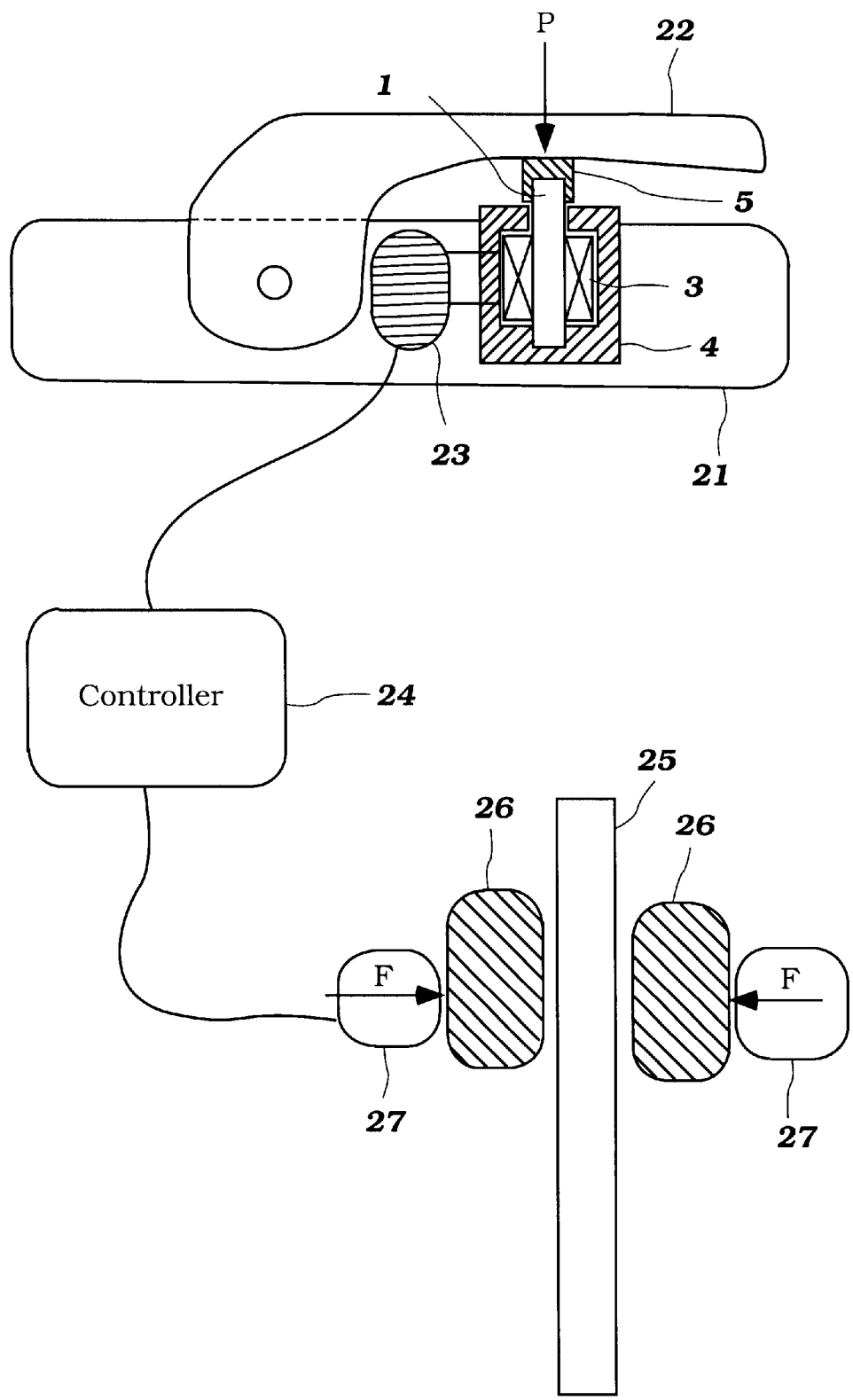
FIG. 25 is a structural diagram of a disc brake system of a motorcycle showing an application 1 of the invention.

FIG. 25 is a structural diagram of a disc brake system of a motorcycle. The load detection device according to this invention (the same device as shown by the embodiment 1, and in FIG. 25, like elements as in FIG. 1 are designated by like numerals) is provided in a handle grip 21 of the motorcycle, and one end of the magnetic substance 1 is in contact with the middle portion of a brake lever 22 through a joint 5.

In the handle grip 21 is incorporated a signal processor circuit 23 connected to the detection coil 3 of the load detection device, and the signal processor circuit 23 is electrically connected to a controller 24.

On the other hand, in FIG. 25, numeral 25 represents a disc-shape brake disc adapted to rotate with a wheel (not shown), and on both sides thereof are disposed calipers 27 for pressing pads 26 against either side of the brake disc 25 to generate a required braking force. The calipers 27 are electrically connected to the controller 24.

When a rider on the motorcycle grips the brake lever 22 for operation, an output signal in proportion to the load P applied by the rider's gripping force to the magnetic substance 1 of the load detection device, is inputted to the signal processor circuit 23, where the inputted output signal is processed to be converted into a voltage, which voltage is inputted to the controller 24. Then, the controller 24 calculates the load P and outputs a control signal in proportion to the load P to the calipers 27 to control the calipers for driving, and the calipers 27 press the pads 26 against either surface of the brake disc 25 to generate a required braking force.

In this example as described above, a load P associated with the rider's gripping force acting in the brake lever 22 can be directly received by the load detection device for detection, thus enhancing operational feeling of the brake.

In addition, braking characteristics that no mechanical brake system is likely to achieve, are imparted by the signal processor circuit 23.

APPLICATION 2

Now, an application 2 of the load detection device according to this invention will be described with reference to FIG. 26 and FIG. 27.

Figure 26:
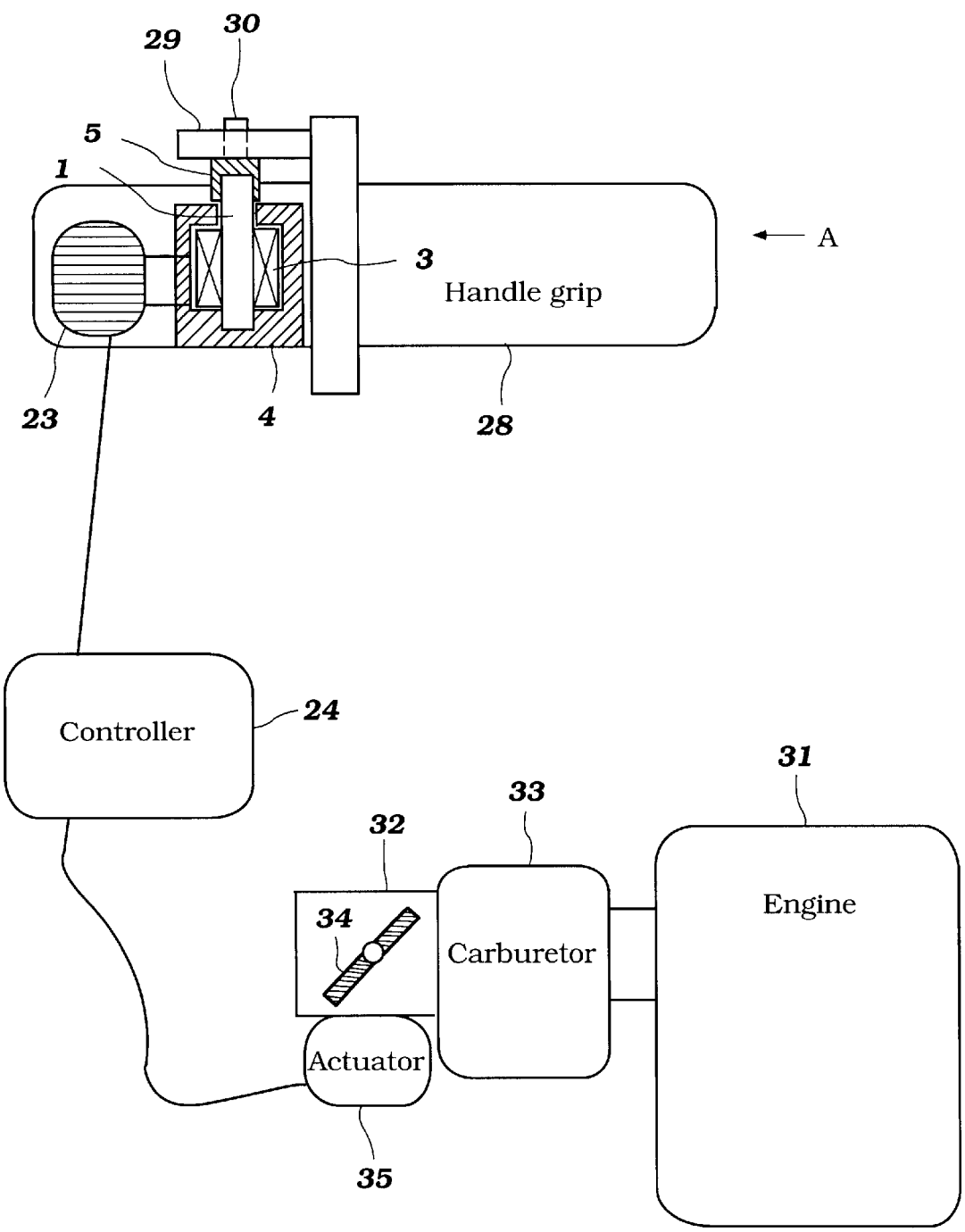
FIG. 26 is a structural diagram of an accelerator system of a motorcycle showing an application 2 of the invention.
Figure 27:
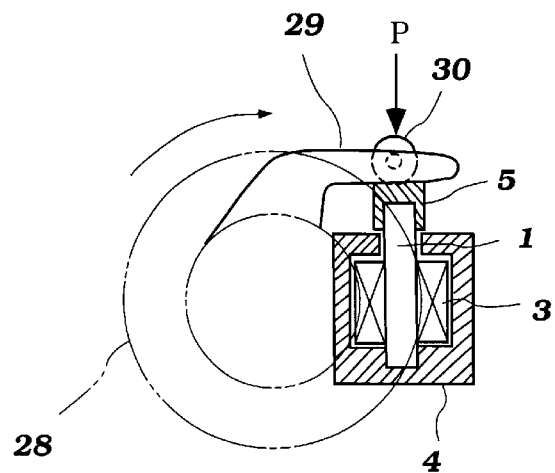
FIG. 27 is a view taken in the direction of the arrow of FIG. 26.

FIG. 26 is a structural diagram of an accelerator system of a motorcycle, and FIG. 27 is a view taken in the direction of the arrow A of FIG. 26. The load detection device according to this invention (the same device as shown by the embodiment 1, and in FIG. 26 and FIG. 27, like elements as in FIG. 1 are designated by like numerals) is provided in a handle grip 28 of a motorcycle, and the joint 5 of the magnetic substance 1 is in contact with one end of a lever 29 formed integral with the handle grip 28, through a roller 30.

In the handle grip 28 is incorporated a signal processor circuit 23 connected to the detection coil 3 of the load detection device, and the signal processor circuit 23 is electrically connected to the controller 24.

On the other hand, in FIG. 26, numeral 31 designates an engine and numeral 32 an intake pipe connected to the intake system of the engine 31; in the middle of the intake pipe 32 is provided a carburetor 33, and in the upstream side of the intake pipe 32 from the carburetor 33 is provided a throttle valve 34. In the vicinity of the throttle valve 34 is provided an actuator 35 for opening/closing the throttle valve 34, the actuator 35 being electrically connected to the controller 24.

When a rider on the motorcycle operates the handle grip 28 in the direction of the arrow in FIG. 27, the rider's operating force is transmitted to the load detection device through the lever 29 and the roller 30, so that the load P is applied to the magnetic substance 1 of the load detection device in the axial direction. Then, an output signal in proportion to the load P is inputted from the load detection device to the signal processor circuit 23, where the inputted output signal is processed to be converted into a voltage, which voltage is inputted to the controller 24. Then, the controller 24 calculates the load P and outputs a control signal in proportion to the load P to the actuator 35 to control the actuator 35 for driving, and the actuator 35 is adapted to open/close the throttle valve 34 to control the amount of intake air into the engine 31.

In this application as described above, there is no need for the handle grip to be turned significantly as in a conventional type, so that the rider need not move his wrist round, improving throttling operation.

In addition, the signal processor circuit 23 allows a throttle control that no mechanical device is likely to achieve, so that the combustion control of mixture in the engine 31 will realize high output power, low exhaust emission, clean combustion, etc.

APPLICATION 3

Figure 28:
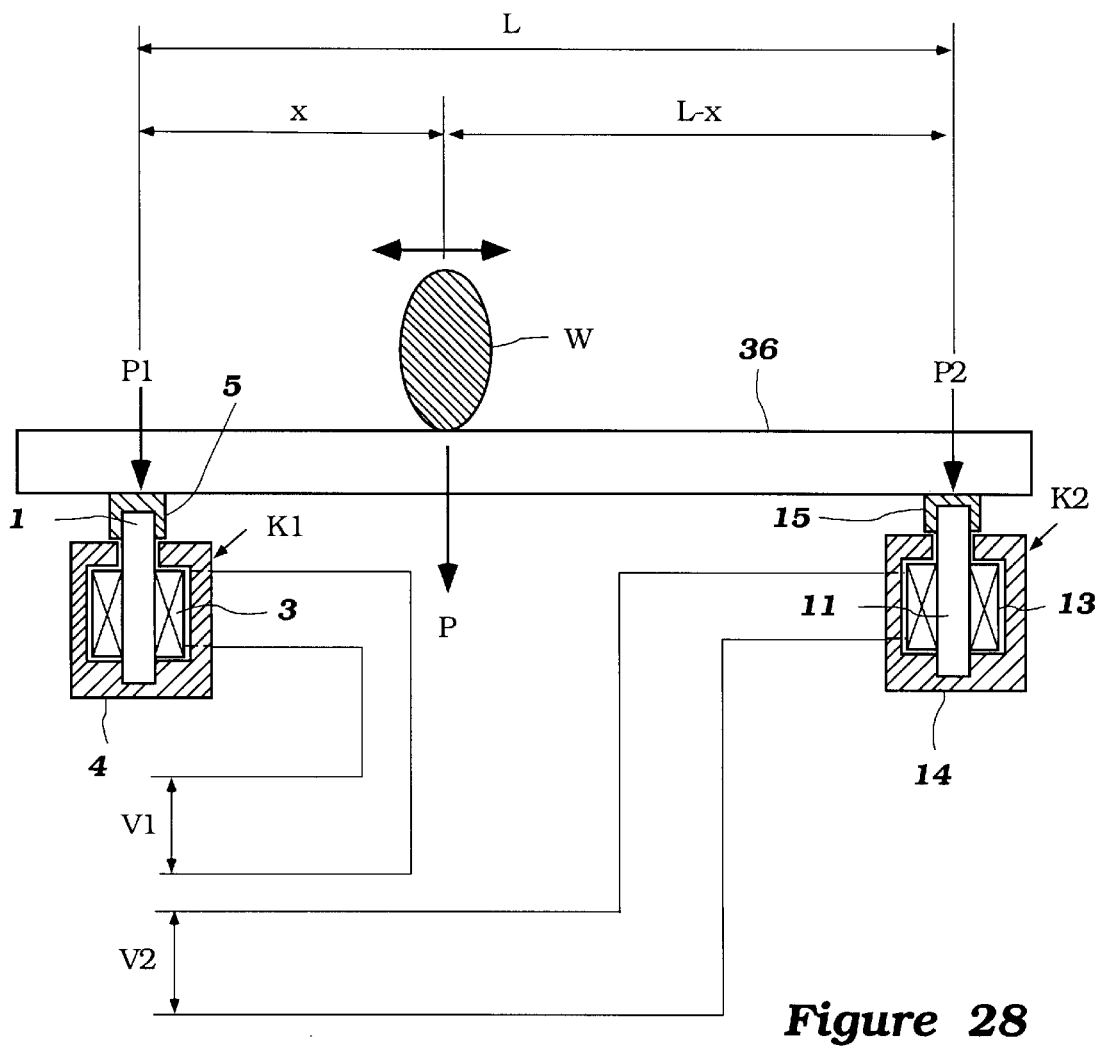
FIG. 28 is a structural diagram of a positioning detection system of a substance showing an application 3 of the invention.

Now, an application 3 of the load detection device according to this invention will be described with reference to FIG. 28. FIG. 28 is a structural diagram of a positioning detection system of an object.

This application shows an example in which the load detection device according to this invention (the same device as shown by the embodiment 1) is utilized in a device for detecting positions of an object W linearly moving on a horizontal beam 36.

Opposite ends of the beam 31 are supported by detection sections K1, K2 of the load detection device according to this invention, the detection sections K1, K2 are composed of magnetic substances 1, 11 and detection coils 3, 13, and magnetic shield cases 4, 14 enclosing these components therein, respectively, and upper ends of the magnetic substances 1,11 are adapted to support the opposite ends of the beam 36 through joints 5, 15.

Provided that the distance L between the two detection sections K1, K2 is known and the weight of the beam 36 can be neglected, the weight P of the object W is received by the detection sections K1, K2, the loads P1, P2 are applied to the magnetic substances 1, 11 in the detection sections K1, K2, respectively, and these loads P1, P2 change its value according to the position x (distance from the loading point of the load P), therefore the relation between P, and P1 and P2 can be written as:

$$P = P1 + P2. \tag{1}$$

Considering the moment balance of the weight P of the object W about the loading point, it follows that $$P1 \cdot x = P2 \ (L-x). \tag{2}$$

Then, from the equations (1), (2), position x of the object W can be written as:

$$x = P2 \cdot L/(P1 + P2) \tag{3}$$

Therefore, if the loads P1, P2 are detected by the detection sections K1, K2 in the load detection device, position x of the object w can be calculated from the equation (3).

When the weight P (=P1+P2) of the object w is known, the equation (3) can be written as:

$$x = p2 \cdot L/P. \tag{3'}$$

Then, if the load P2 is detected only by one detection section K2, position x of the object W can be calculated from the equation (3').

The difference ΔP between loads P1, P2 acting on the two detection sections K1, K2 is $$\Delta P = P1 - P2, \text{ and} \qquad (4)$$

the difference ΔV between outputs of detection sections K1, K2 is $$\Delta V = V1 - V2. \qquad (4')$$

Therefore, the circuit can also be arranged such that this output difference ΔV can be detected.

Figure 29:
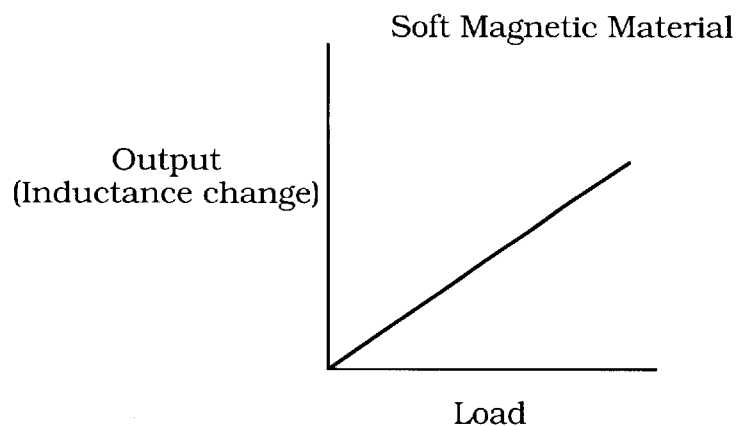
FIG. 29 is a diagram of the output characteristics of a soft magnetic material.
Figure 30:
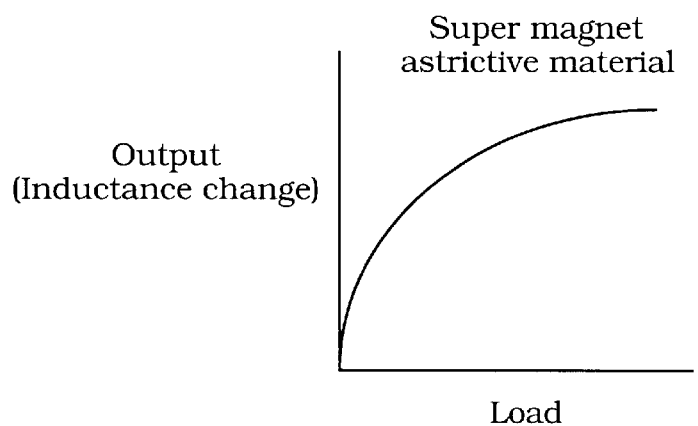
FIG. 30 is a diagram of the output characteristics of a super magnetostrictive material.

In general, with a soft magnetic material being used for a magnetic substance 1, output (inductance change) of the individual sensor is linear as shown in FIG. 29 if a load range is set appropriately, as well as a magnetization current/frequency. On the other hand, with a super magnetostrictive material, the initial rise is great, but the rate of output increase tends to decrease gradually with increasing load.

With a device using the differential output, when load is applied to only one sensor, but not to the other, the output characteristics are similar to those of the respective individual sensor, so that the differential output of the sensor is determined in one-to-one correspondence with the load difference, thus allowing control of the system. A large output is achieved, especially when a super magnetostrictive material is used, providing improved accuracy of the temperature characteristics, etc. In addition, no tensile stress that is deemed to be disadvantageous to the mechanical strength, is exerted, thus providing a wider load range.

Also, with the differential output, when a large load is applied to one sensor and a small load to the other, the differential output of the sensor is determined in one-to-one correspondence with the load difference in any load range, for soft magnetic materials, while for super magnetostrictive materials, the rate of output increase is different depending on the load range with the result that the output for a load difference differs for each load range.

Figure 31:
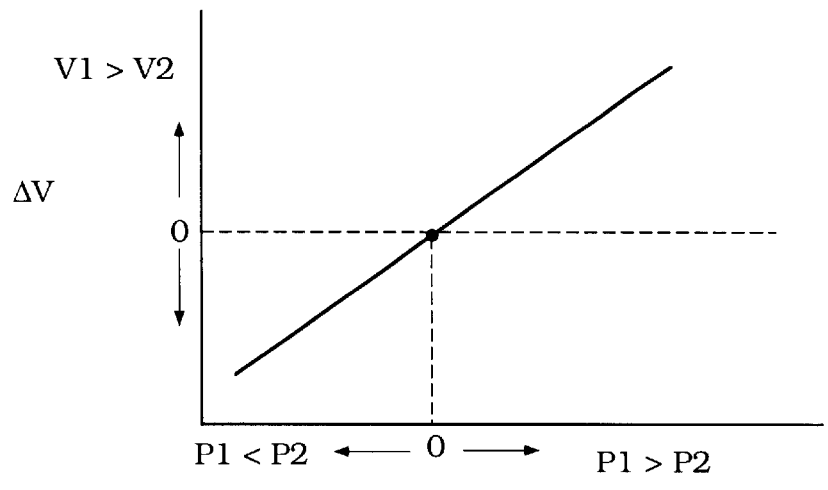
FIG. 31 is a diagram showing the relation between the output difference ΔV and the load difference ΔP.

In view of the foregoing, the magnetic material used for substance 1 and the construction or arrangement of the working sensor, are set appropriately, as well as the control quantity such as a load range and a magnetization current/frequency, so that the ΔV in the equation (4') can be determined in one-to-one correspondence with the ΔP in the equation (4). The values of ΔV become linear with respect to ΔP as shown in FIG. 31, especially when a soft magnetic material is used, thus providing improved controllability. Although the median of the output is zero in FIG. 31, it can be adjusted using a circuit.

Figure 32:
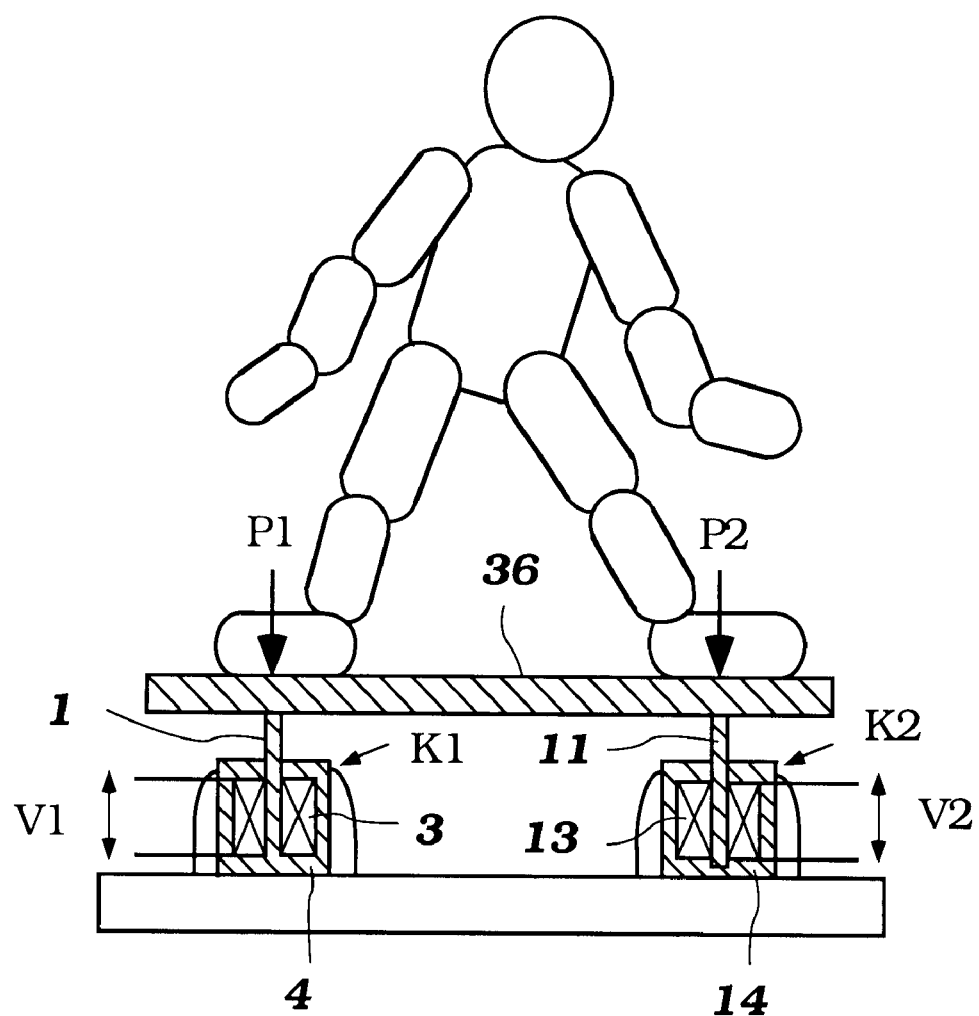
FIG. 32 is a structural diagram of a detection system of human posture showing an application 3 of the invention.

In addition, if the object W shown in FIG. 28 is a human being as shown in FIG. 32, use of the sum of and the difference between the output signals of the detection sections K1, K2, allows detection of the weight P and the difference between the left and right loads P1, P2, so that the posture of the human being on the beam 36 can be presumed. In this case, the beam 36 may be divided.

EFFECT OF THE INVENTION

As is clear from the foregoing, according to this invention, the load detection device is composed of a solid rod-like magnetic substance and a coil for magnetizing the same, so that the diameter of the magnetic substance can be smaller and the construction is simplified, providing a device with a high mechanical strength and a wide dynamic range, capable of effecting smaller size, weight saving and cost reduction, as well as easy handling ability, and suitable for transfer.

Further, according to this invention, a magnetic substance with a small diameter is disposed at the axial center of a coil where the density of magnetic flux is the highest, so that energy necessary for magnetizing the magnetic substance can be kept minimum and inductance is kept small, thus providing easy high-frequency drive advantageous to detection.

Furthermore, according to this invention, load is applied directly to a magnetic substance and the load is detected from inductance change due to change in magnetic permeability of the magnetic substance caused by the load, so that no displacement is accompanied with detection, providing a structure capable of achieving high direct response and easy adjustment with small hysteresis, and unlikely to be affected magnetically.

What is claimed is:

1. An electromagnetic load detection device comprising a plurality of detection sections each including a coil winding and a solid magnetic body disposed in the axial center of said coil winding, a force applying device produce therein a change in its magnetic inductance, said magnetic bodies each being comprised to produce a different inductance change upon the application of the same force, and a circuit including said coil windings for measuring the difference change in magnetic inductance of the respective magnetic bodies to measure said load by measuring the difference in inductance change.

2. The load electromagnetic detection device according to claim 1, wherein said difference in inductance change is produced by a difference in the magnetostrictive coefficient between respective magnetic bodies used in said detection sections.

3. The load electromagnetic detection device according to claim 1, wherein said difference in inductance change is produced by a difference in stress between respective magnetic bodies used in said detection sections.

4. The load electromagnetic detection device according to claim 1, wherein said difference in inductance change is produced by a difference in hardness of heat treatment of respective magnetic bodies used in said detection sections.

5. The electromagnetic load detection device according to claim 1, wherein said difference in inductance change is produced by a difference in magnetic permeability between respective magnetic bodies used in said detection sections.

6. The load electromagnetic detection device according to claim 1, wherein the different inductance of said magnetic bodies is achieved by at least one of the methods comprised of work hardening, heat treatment, surface treatment or volume changing.

7. The electromagnetic load detection device according to claim 1, wherein the plurality of detection sections are disposed coaxial with and opposite to each other, and a difference between output signals from detection sections is determined, so as to detect force applied to magnetic bodies in the respective detection sections.

8. The electromagnetic load detection device according to claim 1, wherein a plurality of detection sections are disposed coaxial and integral with each other, and force is applied at the central portion, so as to be detected in a plurality of directions.

* * * * *